(No Model.)　　　　　　L. D. McINTOSH.　　　　2 Sheets—Sheet 1.

GALVANIC BATTERY.

No. 250,155.　　　　　　　　　Patented Nov. 29, 1881.

Witnesses:
O. W. Bond.
Albert H. Adams.

Inventor:
Lyman D. McIntosh (No Model.) L. D. McINTOSH. 2 Sheets—Sheet 2.
GALVANIC BATTERY.

No. 250,155. Patented Nov. 29, 1881.

Witnesses:

Inventor:
Lyman D. McIntosh.

UNITED STATES PATENT OFFICE.

LYMAN D. McINTOSH, OF WASECA, MINNESOTA.

GALVANIC BATTERY.

SPECIFICATION forming part of Letters Patent No. 250,155, dated November 29, 1881.

Application filed October 28, 1880. (No model.)

*To all whom it may concern:*

Be it known that I, LYMAN D. MCINTOSH, residing at Waseca, in the county of Waseca and State of Minnesota, and a citizen of the United States, have invented a new and useful Improvement in Galvanic Batteries, of which the following is a full description, reference being had to the accompanying drawings, in which—

Figure 1:
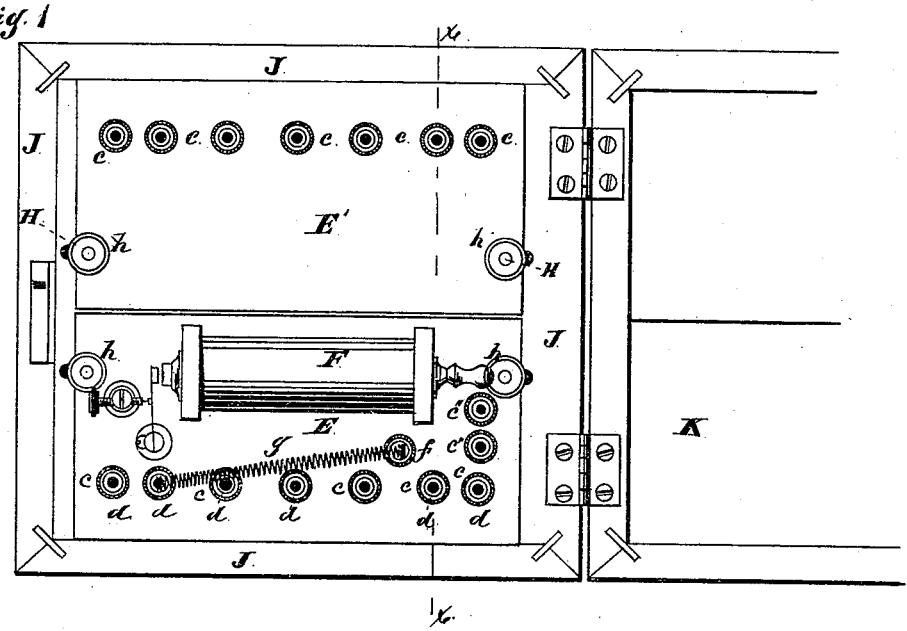
Figure 2:
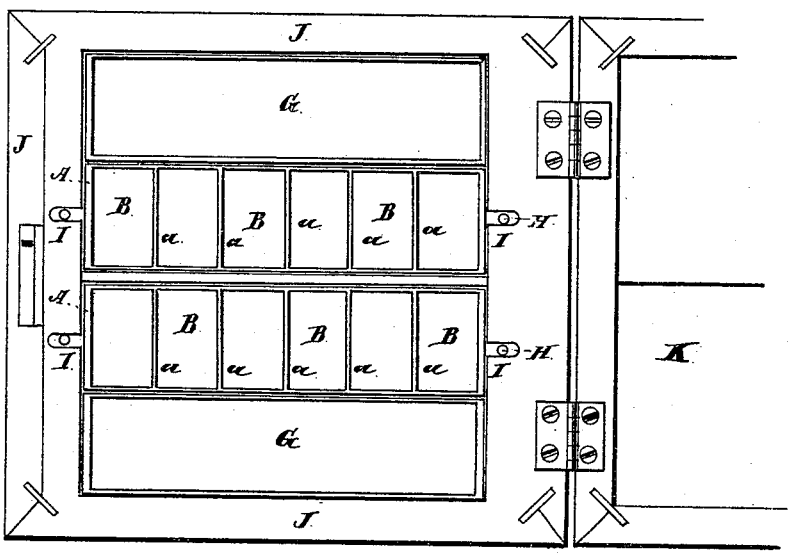
Figure 3:
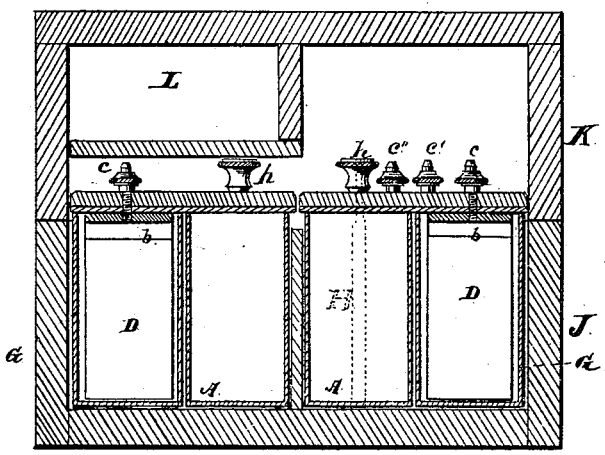
Figure 4:
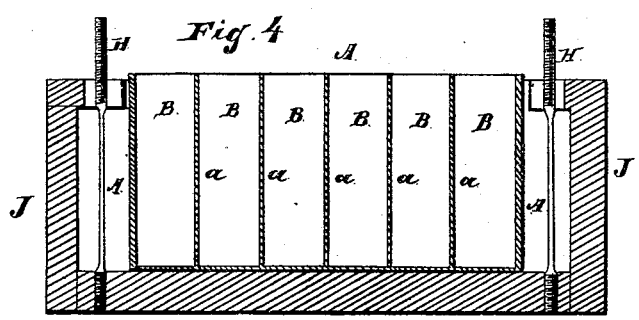
Figure 5:
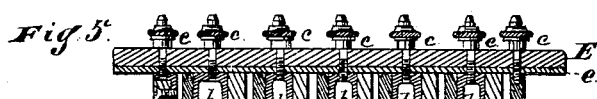
Figure 6:
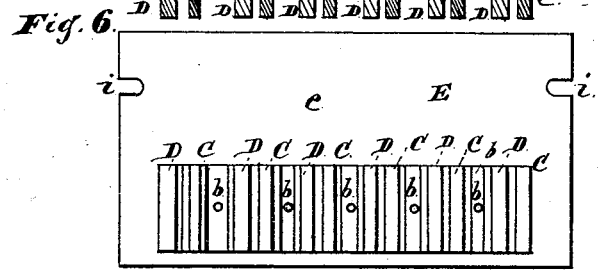

Figure 1 shows the inclosing-case open and the cover partly broken away, with the supporting-plates and the devices thereto attached in the position they occupy when the battery is not in use. Fig. 2 shows the inclosing-case open and the cover partly broken away, with the supporting-plates and their attached devices removed, to show the battery-cells and the drip-cups; Fig. 3, a section on line $x\ x$ of Fig. 1, showing the inclosing-case closed and the battery in its position when not in use; Fig. 4, a longitudinal section through the body of the case and the battery-cells; Fig. 5, a longitudinal section through the supporting-plate and the galvanic plates; Fig. 6, a bottom view of the supporting-plate and battery-plates.

This invention relates to electro-galvanic batteries designed for the use of physicians and others in the treatment of various classes of disease by administering electricity or an electro-galvanic current, and has for its object the construction of a battery which shall be simple, cheap, efficient, and well adapted for the intended use.

In the drawings, A represents the battery-cup; B, the battery-cells; C, the positive or zinc plates; D, the negative or carbon plates; E E', the supporting-plates for the battery-plates and forming covers for the cups or receptacles; F, an ordinary induction-coil; G, the drip-cups; H, the spring clamping-rods; I, the slots in the casing for the clamping-rods; J, the body of the casing or inclosing-case; K, the cover; L, the receptacle for the electrodes and other devices; $a$, the partitions dividing the battery-cup into cells or compartments; $a'$, the space between the pairs of plates for the passage of the partition $a$; $b$, the blocks or pieces connecting the pairs of plates at their upper ends; $c$, the attaching-screws or binding-posts, serving as poles for the battery; $c'$ $c''$, the primary and secondary current selectors; $d$, the openings for the conducting-wire; $e$, the soft-rubber or yielding lining; $f$, the current-post for connecting the cells of battery with the coil; $g$, the current-conducting wire; $h$, the set-nuts of the clamping-rods; $i$, the recesses for the clamping-rods and set-nuts.

The battery-cup A may be made of vulcanized rubber or other non-conducting material, which can be molded, cast, or otherwise formed into shape. This cup, as shown, is rectangular; but its shape may be changed to any other form, and its dimensions can be varied to correspond to the size of the battery. This cup, at regular intervals, is provided with partitions $a$, formed from the same piece of material as the body of the cup, which partitions divide the interior of the cup into compartments or cells B, of a sufficient capacity to receive the battery-fluid and the battery-plates, a pair of plates being inserted in each cell.

The plates C D may be of any of the well-known materials which will generate a galvanic current when arranged in pairs and subjected to an acid solution or battery-fluid that acts on one of the plates—as, for instance, the plates C may be of zinc and the plates D of carbon, these two materials being, respectively, the positive or generating plate and the negative or receiving and conducting plate for a galvanic battery. These plates are arranged in pairs, with a narrow space between the plates composing the pair, as usual, and as many pairs of plates as there are cells in the cup are provided, the plates being of a size to allow them to be inserted or withdrawn easily from their cells. The pairs of plates are separated by a conducting strip or block, $b$, of copper or other suitable material, which strips $b$ are of sufficient width to insure the proper separation of the pairs and leave a space, $a'$, between them, into which the partitions $a$ can pass without coming in contact with the plates. The sides and upper face or top of these strips $b$, as shown, are straight, and their bottom or under face has a recess to receive the upper end of the partitions $a$. The plates C D are attached to the sides of these strips $b$ in any suitable manner, so as to bring their upper ends flush, or nearly so, with the top or upper face of the blocks and not interfere with the attachment of the blocks or strips to the supporting-plates.

The supporting-plates E E' are made of vulcanized rubber or other non-conducting material that will not bend or break easily, and the entire under face of each plate has a lining or covering of soft rubber or other flexible material that will indent or yield under pressure. In the form of construction shown in Fig. 1 the dimensions of these plates E E' are sufficient to extend over and cover or close the openings of both the battery-cup and drip-cup when placed side by side, the material $e$ coming in contact with the edges of the cups on all sides, and making a tight joint between the cups and the cover or plate, when the latter is held down, which will prevent leakage. These plates E E' each have a series of holes lengthwise thereof, which holes extend through the plates, and are so located and arranged that the battery-plates can be attached so as to occupy one-half of the width of the plates, leaving the remaining portion blank or unoccupied, as shown in Fig. 6, to serve as a cover for either cup, accordingly as the battery-plates are in their cells or in the drip-cup. Screw-threaded openings are provided in the connecting-strips $b$ and outer positive plates, C, which openings, when the plates are in position, coincide with the openings through the plates, so that by means of set or binding screws $c$ the plates can be attached in pairs and in proper relation to the battery-cells B, as shown in Figs. 3 and 5. The set-screws $c$ may be of any form of construction suitable for the purpose. As shown, their heads are each provided with a central opening, $d$, to receive the end of the conducting wire or cord, so that the screws also serve as the poles for their respective plates.

The coil F may be of any of the well-known forms of construction for such devices, mounted in any suitable manner on the plate E, and this coil is connected with one pole of the battery in a permanent manner, and through the battery-post $f$ and a suitable connecting-wire, $g$, any number of battery-cells can be brought into circuit with the coil.

The drip-cups G may be made of vulcanized rubber or other non-conducting material that can be molded or formed into shape, the dimensions and shapes corresponding to the dimensions and shape of the battery-cup, so as to have an interior opening without dividing partitions for the reception of the battery-plates when removed from the battery-cups; and in order to catch the drip and prevent wastage these drip-cups are located by the side of the battery-cups.

The clamping wires or rods H are secured, as shown, to the bottom of the body of the receptacle, but may be attached in any other suitable manner so as to extend up above the top of the supporting-plates E E' a sufficient distance to receive screw-threaded heads or buttons $h$, the upper ends of the rods being screw-threaded to allow the buttons $h$ to operate. These rods H, between their upper and lower ends, may be so formed as to give their upper ends an outward spring action, to facilitate their withdrawal from engagement with the plates, and they are so located with reference to the supporting-plates as to engage recesses or notches $i$, formed in the ends of the plate, which notches receive the rods and the lower ends of the buttons, so that when the buttons are screwed down the cover or plates E E' will be drawn tightly against the edges of the cups A G, the edges of the cups indenting the lining $e$, closing the joint and preventing the fluid from spilling or wasting.

The body J of the inclosing-case may be made of wood or other suitable material, with an interior capacity sufficient to receive the cups A G. As shown, its dimensions are such that it can be divided by a partition into two compartments, each of which receives a battery and drip-cup, and at its upper edge is a cross-piece having a notch, I, in which the rods H work, the cross-pieces also serving as means to prevent end-play for the cups. In case this receptacle is of a size to receive the cups and dispense with the cross-pieces, grooves or recesses can be cut in the sides of the receptacles for the rods H.

The cover K is made of wood or other material, and corresponds in size and shape to the body of the receptacle, and is of sufficient depth for the reception of the induction-coil. One-half of the cover, as shown, is provided with a receptacle, L, in which the electrodes and other appliances can be placed when not in use.

At one end of the plate E are two set-screws or binding-posts, $c'$ $c''$, corresponding to $c$ in form and construction, which posts $c'$ $c''$, with the end set-screw post, $c$, form the connections for selecting the primary and secondary currents, the posts being connected with the positive and negative plates in any suitable manner, and the connections from one post to the other at their upper ends for the desired current being made as usual.

The connecting-wire $g$ is of any suitable conducting material, one of its ends being adapted to enter the openings $d$ in the set-screws $c$, and the other the opening in the set-screw $f$, and complete the circuit between the battery and the coil, and this wire is of such length that it can be connected with any one of the set-screws $c$, so as to bring a greater or less number of cells into the circuit. The form of construction shown has two receptacles or cups for battery-plates, and a corresponding number of drip-cups; but the number of such cups can be increased, or only one receptacle with its drip-cup can be used in connection with an induction-coil; and, as shown, each receptacle is divided into six cells for the reception of a corresponding number of pairs of plates; but the number of cells can be varied, and their dimensions increased or decreased, as may be desired. When used in connection with an induction-coil, electrodes of any suitable construction are connected in the usual manner, and one end of the wire *g* is inserted in the opening in the battery posts or pole *f*, and the other end of the wire is inserted in the opening *d* of any desired one of the posts or poles *c* on the plate E, the plates C D being in the cells B and in contact with the battery-fluid. The battery is then ready for use, and the current generated will pass to the electrodes, from which it can be applied as desired. If a stronger current than the one produced when all the cells of the cup of the plate E are in the circuit is required, the plates C D of the plate E' are inserted in their cells, and a connection made between the two series of cells, so that the wire *g* can be inserted in any desired one of the openings *d* of the screws *c* on the plate E, bringing an increased number of cells into the circuit with the coil through the battery-pole *f*, and the current generated will pass to the electrode for use. When it is not desired to use the induction-coil, the plates C D of the plates E E' can be inserted in their respective cells, and the proper connections be made with their respective binding posts or poles *c*, and the current generated can be passed to the electrodes, which are connected in the usual manner.

What I claim as new, and desire to secure by Letters Patent, is as follows:

The receptacle or cup A, having compartments or cells B formed by partitions *a*, and receptacle or cup G, both cups A G formed from single pieces of vulcanized rubber or other non-conducting material, in combination with the plate or cover E, having a lining or covering, *e*, and carrying the battery-plates, whereby the plates are supported and the cups closed by one and the same plate, substantially as and for the purposes specified.

LYMAN D. McINTOSH.

Witnesses:
  O. W. BOND,
  A. H. ADAMS.